United States Patent [19]

Ohkumo

[11] Patent Number: 5,016,590
[45] Date of Patent: May 21, 1991

[54] SYSTEM FOR CONTROLLING IGNITION TIMING OF AN INTERNAL COMBUSTION ENGINE

[75] Inventor: Hiroya Ohkumo, Musashino, Japan

[73] Assignee: Fuji Jukogyo Kabushiki Kaisha, Tokyo, Japan

[21] Appl. No.: 546,525

[22] Filed: Jun. 29, 1990

[30] Foreign Application Priority Data

Jul. 26, 1989 [JP] Japan .................................. 1-195244

[51] Int. Cl.⁵ ................................................. F02P 5/14
[52] U.S. Cl. ..................................................... 123/412
[58] Field of Search ............... 123/412, 425, 416, 488; 364/431.05, 431.12

[56] References Cited

U.S. PATENT DOCUMENTS

| | | | |
|---|---|---|---|
| 4,271,797 | 6/1981 | McCarbery | 123/412 |
| 4,590,563 | 5/1986 | Matsumura et al. | 364/431.05 |
| 4,600,993 | 7/1986 | Pauwels et al. | 364/431.05 |
| 4,814,997 | 3/1989 | Matsumura et al. | 123/412 |

FOREIGN PATENT DOCUMENTS

| | | | |
|---|---|---|---|
| 0101579 | 6/1984 | Japan | 123/412 |
| 60-43178 | 3/1985 | Japan | 123/412 |
| 60-81466 | 5/1985 | Japan | 123/412 |
| 2039994 | 8/1980 | United Kingdom | 123/412 |

*Primary Examiner*—Raymond A. Nelli
*Attorney, Agent, or Firm*—Martin A. Farber

[57] ABSTRACT

A plurality of basic ignition timings are stored in a first memory in accordance with engine speed and absolute pressure of intake air. An ignition timing is calculated based on the basic ignition timing derived from the first memory. A plurality of retard quantities are stored in a second memory in accordance with the atmospheric pressure. One of retard quantities is derived from the second memory in accordance with a detected atmospheric pressure. The basic ignition timing is retarded with the derived retard quantity, thereby correcting the ignition timing.

3 Claims, 6 Drawing Sheets

SYSTEM FOR CONTROLLING IGNITION TIMING OF AN INTERNAL COMBUSTION ENGINE

BACKGROUND OF THE INVENTION

The present invention relates to a system for controlling ignition timing of an internal combustion engine such as an automotive engine, and more particularly, to a system for preventing knocking of the engine at a high altitude.

The ignition timing is advanced with an increase of engine speed. When the load on the engine, which is represented by pressure of intake air, is low, charging efficiency of the intake air in cylinders reduces so that combustion speed decreases. Therefore, it is further necessary to advance the ignition timing in accordance with increase of the intake air pressure.

The ignition timing is determined in accordance with the intake air pressure (absolute pressure) at wide-open throttle as shown by a solid line in FIG. 5. When the engine is operated at a low altitude where the atmospheric pressure is 760 mmHg, the ignition timing at the wide-open throttle is set at a point a. For example, as the atmospheric pressure decreases to 660 mmHg at a higher altitude, the ignition timing at the wide-open throttle is advanced to a point b. However, the intake air charging efficiency at the high altitude is not reduced in proportion to the reduction of the atmospheric pressure. Accordingly, it is necessary to further correct the ignition timing for the high altitude.

Japanese Patent Application Laid Open Nos. 60-43178 and 60-81466 disclose ignition timing control system at the high altitude. Since the engine power decreases at the high altitude, the ignition timing is advanced taking into consideration of intake air charging efficiency reduction.

However, at the high altitude, the pressure of exhaust gas decreases with the atmospheric pressure so that the amount of the exhaust gas from the cylinders during the valve overlap period reduces. Accordingly, when the engine is operated at the same intake air pressure (absolute pressure) the intake air charging efficiency increases compared with that at low altitude. Therefore, if the ignition timing is advanced by the angle which is controlled by the same intake air pressure as the low altitude, the timing is excessively advanced, which causes knocking of the engine.

SUMMARY OF THE INVENTION

The object of the present invention is to provide a system for controlling the ignition timing without causing knocking of the engine at high altitude.

According to the present invention, there is provided an ignition timing control system for an engine for a motor vehicle having a first memory storing a plurality of basic ignition timings in accordance with engine speed and absolute pressure of intake air and an ignition timing calculator for calculating an ignition timing based on the basic ignition timing derived from the first memory.

The system comprises an atmospheric pressure sensor detecting the atmospheric pressure, a second memory storing a plurality of retard quantities in accordance with the atmospheric pressure, means for deriving one of retard quantities from the second memory in accordance with the detected atmospheric pressure, and correcting means for retarding the basic ignition timing with the derived retard quantity.

In an aspect of the invention, the retard quantity increases with a reduction of the atmospheric pressure.

The other objects and features of this invention will become understood from the following description with reference to the accompanying drawings.

DETAILED DESCRIPTION OF THE PREFERRED EMBODIMENT

Figure 1:
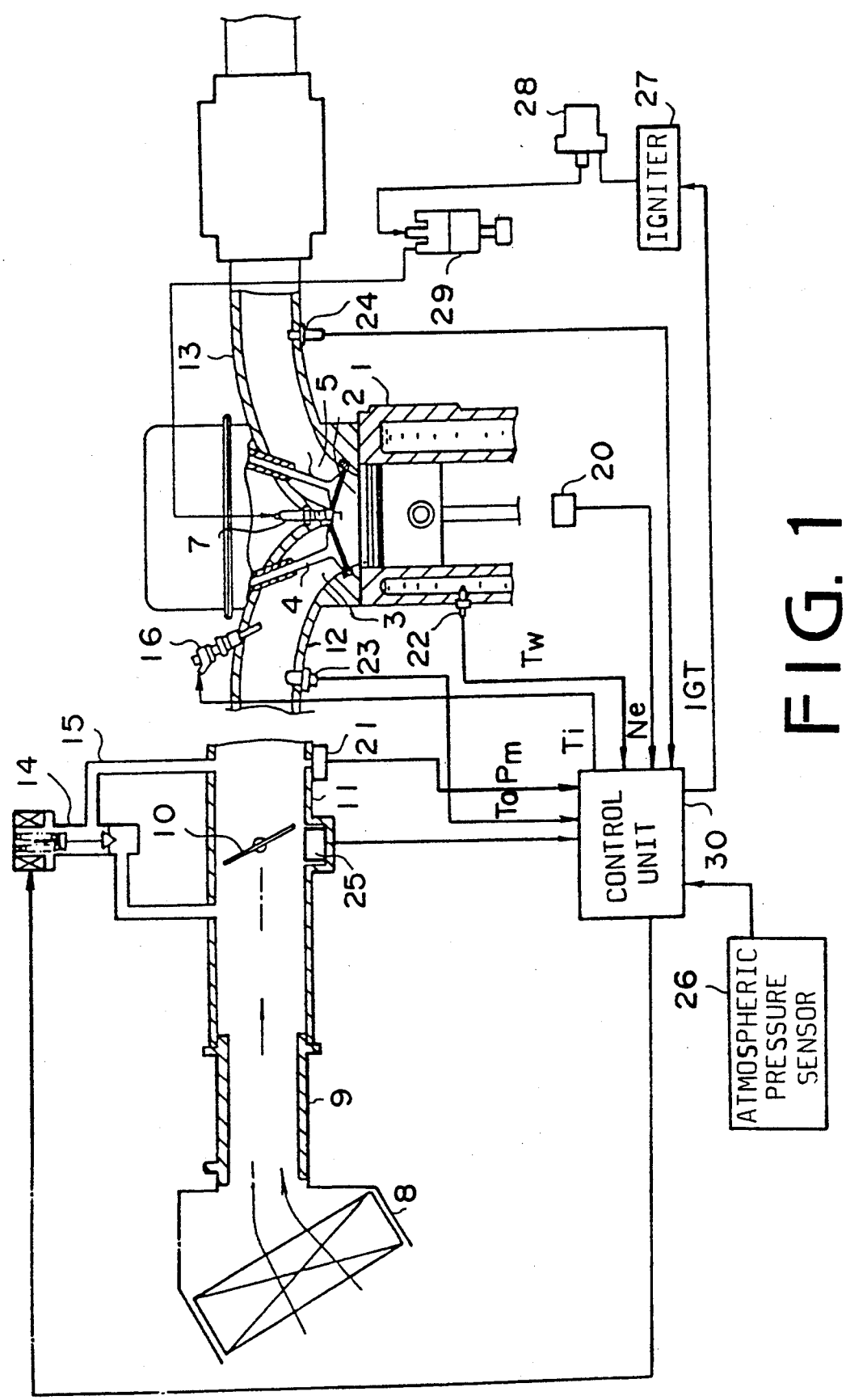
FIG. 1 is a schematic illustration of an engine to which the present invention is applied.

Referring to FIG. 1, an engine 1 has a throttle valve 10 provided in a throttle body 11 communicated with an air cleaner 8 through an intake pipe 9. The throttle body 11 is communicated with an intake manifold 12 which is communicated with a combustion chamber 2 of each cylinder in the engine 1 through an intake port 3 and an intake valve 4. A bypass 15 having an idle speed control (ISC) valve 14 is provided around the throttle valve 10. A spark plug 7 is located in each combustion chamber 2 and a multiple-point fuel injector 16 is provided in the intake manifold 12 adjacent each intake port 3. Exhaust gases from the chamber 2 are discharged through an exhaust port 5, an exhaust valve 6 and an exhaust manifold 13. The engine 1 is provided with a crank angle sensor 20, a pressure sensor 21 for detecting absolute pressure in the intake pipe 11 downstream of the throttle valve 10, a coolant temperature sensor 22, an intake air temperature sensor 23, an $O_2$-sensor 24 for detecting oxygen concentration of the exhaust gases in the exhaust manifold 13, a throttle position sensor 25 and an atmospheric pressure sensor 26. Output signals from the sensors 20 to 26 are applied to a control unit 30 which applies a fuel injection signal to the injector 16, an idle signal to the ISC valve 14 and an ignition signal to the spark plug 7 through an igniter 27, an ignition coil 28 and a distributor 29. An engine speed Ne is calculated based on a crank angle signal from the crank angle sensor 20 and an intake pressure Pm is calculated based on the signal from the pressure sensor 21, which are used for calculating a basic injection pulse width Tp. The basic injection pulse width Tp is corrected in accordance with a coolant temperature Tw from the coolant temperature sensor 22, an intake air temperature Ta from the intake air temperature sensor 23 and a feedback signal from the $O_2$-sensor 24. The fuel injector 16 injects a quantity of fuel which corresponds to a corrected injection pulse width Ti.

On the other hand, it is determined that the engine 1 is idling in accordance with a throttle opening degree detected by the throttle position sensor 25, or with the idle signal from an idle switch. An opening degree of the ISC valve 14 is adjusted to control the engine idling speed.

Figure 2A:
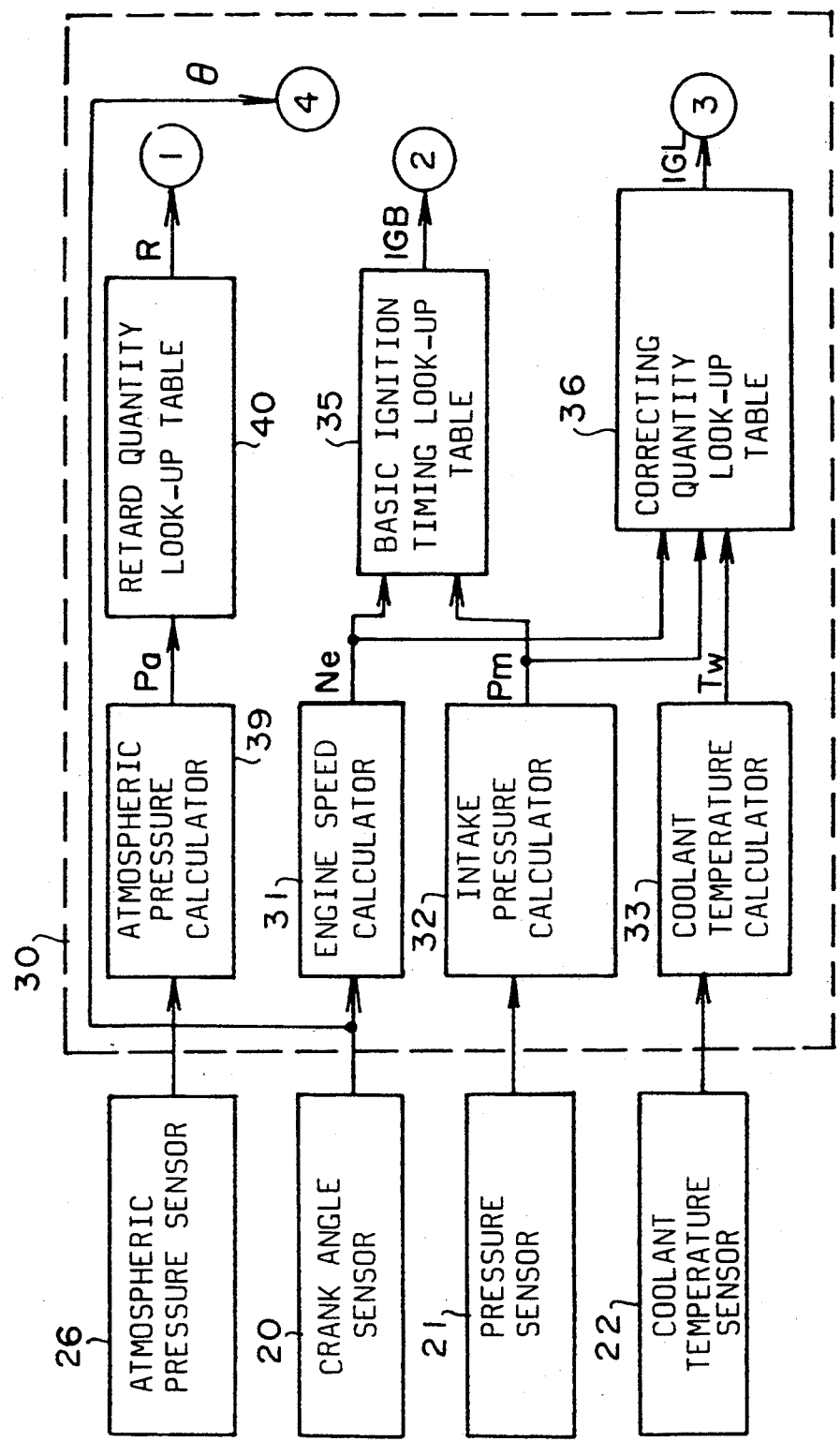
FIGS. 2a and 2b show a block diagram of a control system according to the present invention.
Figure 2B:
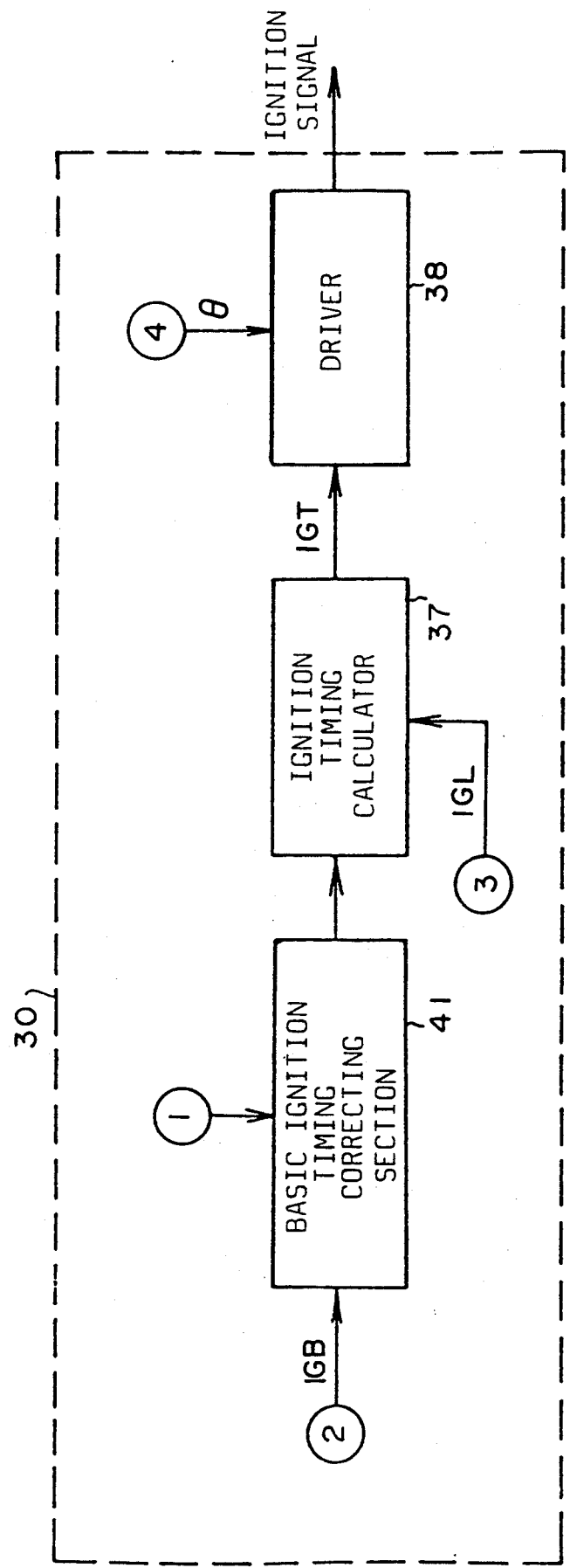

Referring to FIGS. 2a and 2b, the control unit 30 has an engine speed calculator 31, an intake pressure calculator 32, a coolant temperature calculator 33 and an atmospheric pressure calculator 39. The engine speed calculator 31 calculates the engine speed Ne based on the output signal of the crank angle sensor 20, the intake pressure calculator 32 calculates the absolute pressure Pm based on the output of the pressure sensor 21.

The engine speed Ne and the intake pressure Pm are fed to a basic ignition timing look-up table 35 storing plurality of basic ignition timings IGB, arranged in accordance with the engine speed Ne and the intake air pressure Pm.

Figure 3:
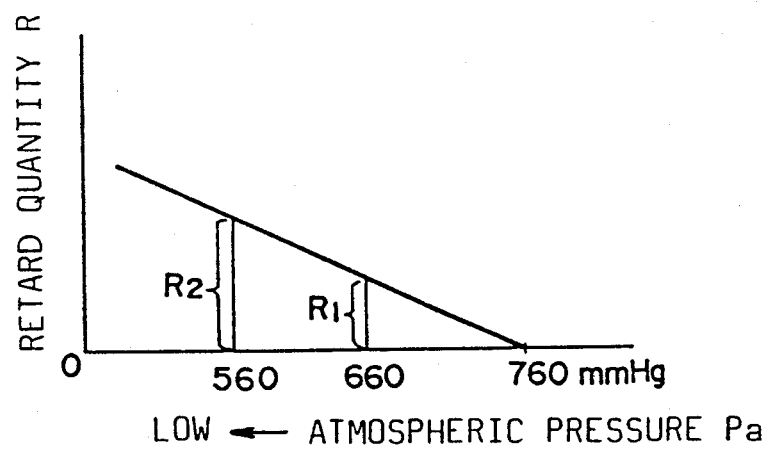
FIG. 3 is a graph showing a relationship between atmospheric pressure and retard quantity.

On the other hand, the atmospheric pressure Pa calculated at the atmospheric pressure calculator 39 is applied to a retard quantity look-up table 40 where a retard quantity R for correcting the basic ignition timing IGB when the vehicle is driven at a high altitude is derived. As shown in FIG. 3, the retard quantity is determined in accordance with the atmospheric pressure Pa. Namely, the retard quantity which is zero at mean sea level, increases with a decrease of the atmospheric pressure Pa. The retard quantity R is applied to a basic ignition timing correcting section 41 where the basic ignition timing IGB derived from the look-up table 35 is corrected in accordance with IGB←IGB - R.

The engine speed Ne, intake pressure Pm and the coolant temperature Tw calculated at the calculator 33 are fed to a correcting quantity look-up table 36 where a correcting quantity IGL is derived. The correcting quantity IGL is applied to an ignition timing calculator 37, where the ignition timing IGT is calculated as follows.

IGT=IGB+IGL

The ignition timing IGT and the crank angle signal $\theta$ is applied to the igniter 27 through a driver 38 so as to ignite the spark plug 7 at the calculated timing IGT in accordance with the crank angle signal $\theta$.

Figure 4:
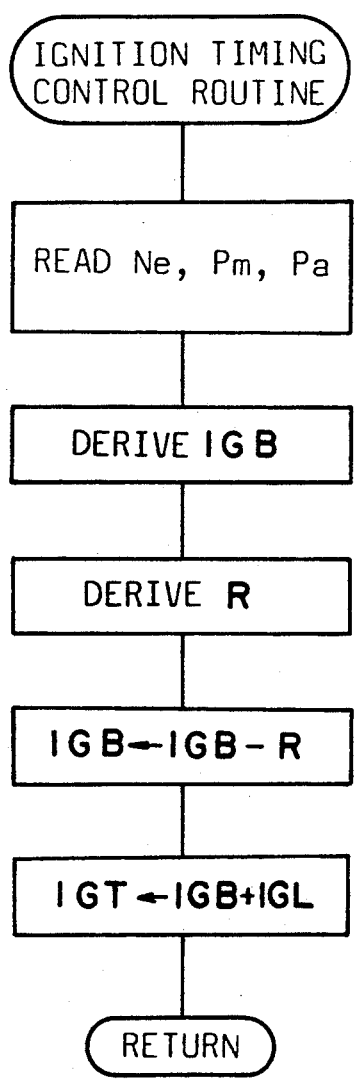
FIG. 4 is a flowchart showing the operation of the system.

The operation of the ignition timing control system is described hereinafter with reference to the flowchart shown in FIG. 4.

When the engine 1 is operated, the basic ignition timing IGB is derived from the basic ignition timing look-up table 35 in dependency on the engine speed Ne and the absolute intake pressure Pm. On the other hand, the retard quantity R is derived from the retard quantity look-up table 40 in accordance with the detected the atmospheric pressure Pa. When the vehicle is driven at a low altitude, the retard quantity R is 0, so that the basic ignition timing IGB is fed to the ignition timing calculator 37 without correction. The correcting quantity IGL according to the coolant temperature Tw is added to the basic ignition timing IGB at the calculator 37 to obtain the ignition timing IGT and the ignition timing signal corresponding to the ignition timing IGT is fed to the igniter 27 through the driver 38.

Figure 5:
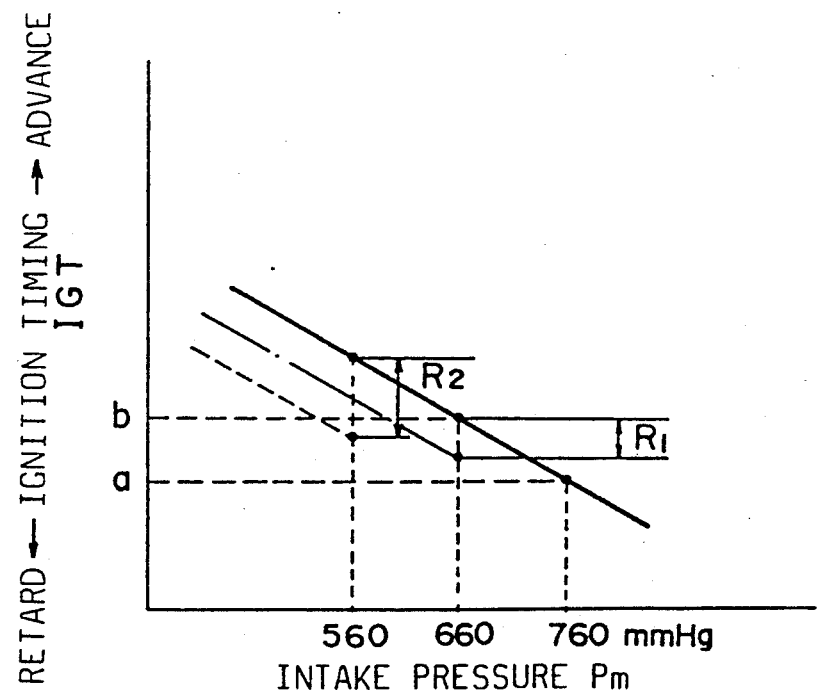
FIG. 5 is a graph showing ignition timings at high and low altitudes.

As the altitude increases, the retard quantity R derived from the retard quantity look-up table 40 increases. The basic ignition timing IGB is corrected with the retard quantity R at the basic ignition timing correcting section 41. The basic ignition timing IGB, which has been advanced at the look-up table 35 in accordance with the reduction of the intake air pressure dependent on the decrease of the atmospheric pressure Pa as shown by the solid line in FIG. 5, is retarded as shown by a dotted or a dash-and-dot line at the correcting section 41. Consequently, an excessive advanced condition for a large amount of the intake air at the high altitude because of the reduction of exhaust gas in the cylinders is corrected by the retard quantity R, thereby to provide an optimum ignition timing.

From the foregoing, it will be understood that the present invention provides an ignition timing control system where a basic ignition timing determined in accordance with the engine operating condition is retarded with the altitude. Therefore, an ignition timing appropriate for the actual quantity of the intake air and the combustion speed is obtained, thereby reliably preventing the occurrence of knocking. In addition, the ignition timing is determined in accordance with the atmospheric pressure so that maximum torque is obtained without causing knocking, thereby improving the driveability of the vehicle. Moreover, since the retard quantity is inversely proportional to the atmospheric pressure, the ignition timing is adequately corrected in dependency on the altitude at which the vehicle is driven.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An ignition timing control system for an engine having a first memory storing a plurality of basic ignition timings in accordance with engine speed and absolute pressure of intake air and an ignition timing calculator for calculating an ignition timing based on the basic ignition timing derived from said first memory, the system comprising:

an atmospheric pressure sensor detecting the atmospheric pressure;

a second memory storing a plurality of retard quantities in accordance with the atmospheric pressure;

means for deriving one of retard quantities from said second memory in accordance with the detected atmospheric pressure; and correcting means for retarding said basic ignition timing with said derived retard quantity in proportion to said atmospheric pressure so as to prevent knocking at any operating conditions.

2. The system according to claim 1, wherein said retard quantity increases with a reduction of the atmospheric pressure.

3. The system according to claim 1, wherein said basic ignition timing is advanced as the absolute pressure of intake air reduces.

* * * * *